(12) United States Patent
Sakakibara et al.

(10) Patent No.: US 6,977,004 B2
(45) Date of Patent: Dec. 20, 2005

(54) VAPOR-LIQUID SEPARATOR

(75) Inventors: Yasufumi Sakakibara, Okazaki (JP); Haruhiko Kamino, Nagoya (JP)

(73) Assignee: Maruyasu Industries Co. Ltd. (JP)

( * ) Notice: Subject to any disclaimer, the term of this patent is extended or adjusted under 35 U.S.C. 154(b) by 218 days.

(21) Appl. No.: 10/328,787

(22) Filed: Dec. 24, 2002

(65) Prior Publication Data

US 2003/0115844 A1 Jun. 26, 2003

(30) Foreign Application Priority Data

Dec. 25, 2001 (JP) .......................................... 2001-391043

(51) Int. Cl.[7] .......................... B01D 19/00; B01D 45/12
(52) U.S. Cl. ................................ 55/396; 55/447; 55/455; 55/456; 96/188; 210/512.1
(58) Field of Search ................ 210/512.1, 787; 209/134; 96/188; 55/396, 397, 413, 447, 455, 456

(56) References Cited

U.S. PATENT DOCUMENTS 3,893,914 A 7/1975 Bobo
4,811,566 A * 3/1989 Silvestri et al. ............... 55/397
5,669,948 A * 9/1997 Brottg.ang.rdh et al. ... 55/459.1

FOREIGN PATENT DOCUMENTS

| EP | 0 874 193 | 10/1998 |
|---|---|---|
| JP | 60-235661 | 11/1985 |
| JP | 6-5301 | 1/1991 |
| JP | 8-315839 | 11/1996 |
| JP | 9-17438 | 1/1997 |
| JP | 2000-161602 | 6/2000 |
| JP | 2000-357529 | 12/2000 |
| JP | 2001-68138 | 3/2001 |

OTHER PUBLICATIONS

PTO–2005–5466–Translation of Japanese Kokai Patent Publication No. S60–235661, published Nov. 22, 1985.*

* cited by examiner

Primary Examiner—David A. Reifsnyder
(74) Attorney, Agent, or Firm—Fish & Richardson P.C.

(57) ABSTRACT

A vapor-liquid separator includes an outer tube, an introduction tube, a delivery tube, and a discharge tube. The introduction tube allows passage of a vapor-liquid two-phase fluid in a swirling state. The delivery tube allows passage of the vapor phase separated from the vapor-liquid two-phase fluid. The introduction tube and the delivery tube are coaxially provided at the corresponding axially opposite ends of the outer tube. The discharge tube is provided on the outer tube in the vicinity of the axial end face of the outer tube on the side toward the introduction tube. The discharge tube is adapted to discharge therefrom the liquid phase separated from the vapor-liquid two-phase fluid. An outlet of the introduction tube and a delivery port of the delivery tube are located axially inside the outer tube by respectively predetermined axial distances while facing each other with a predetermined axial distance therebetween.

6 Claims, 6 Drawing Sheets

VAPOR-LIQUID SEPARATOR

BACKGROUND OF THE INVENTION

1. Field of the Invention

The present invention relates to a vapor-liquid separator for separating the liquid phase from a vapor-liquid two-phase fluid in the form of liquid droplets.

2. Description of the Related Art

Conventionally, a so-called cyclone vapor-liquid separator has been known as a vapor-liquid separator for separating the liquid phase from a vapor-liquid two-phase fluid in the form of liquid droplets. The cyclone vapor-liquid separator includes a cylindrical container; an introduction tube for introducing a vapor-liquid two-phase fluid into the container along a direction tangent to the cylindrical inner wall surface of the container; a delivery tube disposed on the center axis of the container and adapted to deliver to the exterior of the container the vapor phase remaining after separation of the liquid phase; and a discharge tube for discharging the separated liquid therethrough to the exterior of the container from a bottom portion of the container.

In the cyclone vapor-liquid separator, the vapor-liquid two-phase fluid introduced into the container from the introduction tube flows in a swirling state toward the center axis of the container from the cylindrical inner wall surface of the container. Centrifugal force generated in the vapor-liquid two-phase fluid causes the liquid phase, which is of higher specific gravity than the vapor phase, to fly toward the cylindrical inner wall surface of the container, thereby separating the liquid phase from the vapor phase. The separated liquid phase impinges on the cylindrical inner wall surface of the container to thereby be formed into liquid droplets. The thus-formed liquid is discharged to the exterior of the container from the discharge tube. The vapor phase remaining after separation of the liquid phase is delivered to the exterior of the container from the delivery tube disposed on the center axis of the container. In this manner, the vapor and liquid phases of the vapor-liquid two-phase fluid are separated from each other.

In the cyclone vapor-liquid separator, the vapor-liquid two-phase fluid introduced into the container from the introduction tube has predominantly a circumferential velocity component in the stage of swirl flow, whereas, in the subsequent stage where the vapor phase converges to the vicinity of the center axis of the container and enters the delivery tube through its opening portion, an axial velocity component becomes predominant. This abrupt change from the circumferential velocity component to the axial velocity component induces a relatively large pressure loss in a flow of the vapor-liquid two-phase fluid.

SUMMARY OF THE INVENTION

The present invention has been accomplished in view of the above-mentioned problem, and an object of the present invention is to provide a vapor-liquid separator producing a small pressure loss.

To achieve the above object, the present invention provides a vapor-liquid separator comprising an introduction path allowing passage of a vapor-liquid two-phase fluid in a swirling state, the introduction path having an outlet via which the vapor-liquid two-phase fluid flows out of the introduction path; a delivery port provided in opposition to the outlet of the introduction path at a predetermined axial distance from the outlet and allowing passage of vapor phase separated from the vapor-liquid two-phase fluid; an outer tube surrounding the outlet of the introduction path while providing a predetermined separation between the outer tube and the outlet, the outer tube separating the vapor phase and liquid phase from each other; and a discharge tube provided on the outer tube and adapted to discharge from the outer tube the liquid phase separated from the vapor-liquid two-phase fluid.

The vapor-liquid separator of the present invention functions in the following manner. The vapor-liquid two-phase fluid passes through the introduction path in a swirling state and is discharged from the outlet of the introduction path while maintaining a swirling motion. Centrifugal force generated in the discharged vapor-liquid two-phase fluid causes the liquid phase, which is of higher specific gravity than the vapor phase, to fly toward the inner wall surface of the outer tube, which surrounds the outlet of the introduction path while providing a predetermined separation between the outer tube and the outlet, thereby separating the liquid phase from the vapor phase. The separated liquid phase impinges on the inner wall surface of the outer tube to thereby be formed into liquid droplets. The thus-formed liquid is discharged to the exterior of the outer tube from the discharge tube provided on the outer tube. The vapor phase remaining after separation of the liquid phase is delivered to the exterior of the outer tube from the delivery port provided in opposition to the outlet of the introduction path at a predetermined axial distance from the outlet. In this manner, the vapor phase and the liquid phase of the vapor-liquid two-phase fluid are separated from each other.

Since the outlet of the introduction path and the delivery port are disposed axially in opposition to each other with a predetermined axial distance therebetween, the vapor-liquid two-phase fluid introduced into the vapor-liquid separator is not subjected to abrupt change in the direction of flow; thus, a pressure loss arising in the flow of the vapor-liquid two-phase fluid within the vapor-liquid separator is smaller than that in a cyclone vapor-liquid separator.

As mentioned previously, the vapor-liquid two-phase fluid is discharged from the outlet of the introduction path while maintaining a swirling motion. Centrifugal force generated in the discharged vapor-liquid two-phase fluid causes the liquid phase to fly toward the inner wall surface of the outer tube. In this case, not all of the flying liquid phase reaches the inner wall surface of the outer tube to thereby be formed into liquid droplets. Conceivably, a portion of the flying liquid phase remains stagnant in the vicinity of the inner wall surface of the outer tube. Upon being caught by a flow of the vapor phase delivered to the exterior of the outer tube from the delivery port, such a stagnant portion of the liquid phase may be delivered together with the vapor phase to the exterior of the outer tube from the delivery port, thereby leading to a drop in the liquid phase recovery percentage of the vapor-liquid separator.

In order to enhance the liquid phase recovery percentage of the vapor-liquid separator, preferably, the delivery port is formed on a delivery tube, and the outer tube surrounds the delivery port while providing a predetermined separation between the outer tube and the delivery port.

According to the above configuration, the outer tube surrounds the delivery port formed on the delivery tube while providing a predetermined separation between the outer tube and the delivery port. Thus, at least the delivery port is located radially inward from the inner wall surface of the outer tube. Therefore, the liquid phase remaining stagnant in the vicinity of the inner wall surface of the outer tube is unlikely to be caught by a flow of the vapor phase and delivered to the exterior of the outer tube from the delivery port, thereby enhancing the liquid phase recovery percentage of the vapor-liquid separator.

Preferably, the opening area of the delivery port formed on the delivery tube is smaller than the opening area of the outlet of the introduction path.

The above feature further enhances the previously-mentioned effect that the liquid phase remaining stagnant in the vicinity of the inner wall surface of the outer tube is unlikely to be caught by a flow of the vapor phase and delivered to the exterior of the outer tube from the delivery port, thereby further enhancing the liquid phase recovery percentage of the vapor-liquid separator.

As mentioned previously, the liquid phase that has reached the inner wall surface of the outer tube is formed into liquid droplets, and the thus-formed liquid is discharged to the exterior of the outer tube from the discharge tube provided on the outer tube. In this connection, enhancement of liquid discharge efficiency is desirable. A conceivable method for enhancing liquid discharge efficiency is to install the outer tube vertically such that the discharge tube is situated at a lower portion of the outer tube. However, in a certain case, vertical installation of the outer tube may be difficult, because of limitations imposed on space where the vapor-liquid separator is to be mounted. Thus, desirably, even when the outer tube is installed horizontally, the vapor-liquid separator can enhance the discharge efficiency for liquid obtained through formation of liquid droplets.

In order to achieve the above end, preferably, the outlet of the introduction path and the delivery port formed on the delivery tube are located axially inside the outer tube by respectively predetermined axial distances as measured from corresponding axial end faces of the outer tube, and the discharge tube is located in the vicinity of the axial end face of the outer tube on the side toward the introduction path.

According to the present inventors experimental findings, when the outlet of the introduction path and the delivery port formed on the delivery tube are located axially inside the outer tube by certain respective axial distances as measured from corresponding axial end faces of the outer tube, the axial distances can be adjusted in relation to the axial distance between the end faces of the outer tube such that pressure is distributed on the inner wall surface of the outer tube in such a manner as to gradually decrease toward the introduction path from the delivery tube.

Employment of the above dimensional feature causes liquid droplets adhering to the inner wall surface of the outer tube to intensively move toward the introduction path; thus, the resultant liquid is intensively discharged from the discharge tube located in the vicinity of the axial end face of the outer tube on the side toward the introduction path. Therefore, even when the outer tube is disposed horizontally, the discharge efficiency for liquid obtained through formation of liquid droplets is enhanced.

Preferably, the delivery port is formed on the outer tube. Employment of this structural feature eliminates the need to provide the above-mentioned delivery tube, thereby reducing the number of parts and in turn lowering manufacturing cost.

In order to enhance the recovery percentage for the liquid phase in separation of the liquid phase from the vapor-liquid two-phase fluid which is discharged from the outlet of the introduction path while maintaining a swirling motion, desirably, a swirl velocity component of the liquid phase in the stage of discharge from the outlet is increased so as to increase centrifugal force imposed on the liquid phase.

In order to achieve the above end, preferably, a narrow plate twisted at a predetermined pitch is disposed within the introduction path in order to generate a swirling flow of the vapor-liquid two-phase fluid.

The narrow plate twisted at a predetermined pitch and disposed within the introduction path imparts a swirl velocity component to the vapor-liquid two-phase fluid that passes along the narrow plate. Since the swirl velocity component is imparted to the vapor-liquid two-phase fluid within the introduction path at a position relatively close to the outlet of the introduction path, the swirl velocity component imparted to the vapor-liquid two-phase fluid does not decrease greatly before the vapor-liquid two-phase fluid reaches the outlet of the introduction path, but is maintained near its original value. In the case where the vapor-liquid two-phase fluid introduced into the introduction path already has a swirl velocity component, while the vapor-liquid two-phase fluid passes along the narrow plate, the swirl velocity component is accelerated; thus, the vapor-liquid two-phase fluid discharged from the outlet of the introduction path has an increased swirl velocity component.

Further, since the vapor-liquid two-phase fluid flows linearly in one direction when passing along the narrow plate disposed within the introduction path and twisted at a predetermined pitch, a pressure loss associated with impartment of a swirl velocity component to the vapor-liquid two-phase fluid within the introduction path is small.

Even when a swirl vapor-liquid separator such as the previously mentioned cyclone vapor-liquid separator is used, not all of the liquid phase can be recovered from the vapor-liquid two-phase fluid. In order to enhance the recovery percentage for the liquid phase, two swirl vapor-liquid separators may be connected in series such that the second-stage swirl vapor-liquid separator recovers, to the greatest possible extent, the liquid phase which the first-stage swirl vapor-liquid separator has failed to recover. However, as mentioned previously, the cyclone vapor-liquid separator or a like swirl vapor-liquid separator involves generation of a large pressure loss in a flow of the vapor-liquid two-phase fluid within the same. Therefore, connection of two such vapor-liquid separators in series accelerates the pressure loss.

In order to reduce a pressure loss that arises in a flow of the vapor-liquid two-phase fluid when two vapor-liquid separators are connected in series, the following configuration is preferred. A vapor-liquid separator employed at the first stage is a swirl vapor-liquid separator which separates the vapor-liquid two-phase fluid into the vapor phase and the liquid phase by causing the vapor-liquid two-phase fluid to generate a swirling flow. A vapor-liquid separator employed at the second stage is the vapor-liquid separator of the present invention. The introduction path of the second-stage vapor-liquid separator is connected to a delivery tube of the first-stage swirl vapor-liquid separator, which delivery tube allows passage in a swirling state of the vapor-liquid two-phase fluid which has passed through the first-stage swirl vapor-liquid separator.

A pressure loss involved in the above configuration is smaller than that involved in the case where two swirl vapor-liquid separators, or two cyclone vapor-liquid separators, are connected in series, since, as mentioned previously, a pressure loss involved in the vapor-liquid separator of the present invention is smaller than that involved in a swirl vapor-liquid separator such as a cyclone vapor-liquid separator.

Preferably, the introduction path of the second-stage vapor-liquid separator of the present invention is formed in the delivery tube of the first-stage swirl vapor-liquid separator. In this case, the delivery tube of the first-stage swirl vapor-liquid separator serves as the introduction path of the second-stage vapor-liquid separator, thereby reducing the number of parts and in turn lowering manufacturing cost.

Preferably, a portion of the introduction path in the vicinity of the outlet broadens toward an outlet end of the introduction path. Through employment of this feature, the liquid phase that is separated from the vapor-liquid two-phase fluid within the introduction path flies more readily toward the inner wall surface of the outer tube.

DESCRIPTION OF THE PREFERRED EMBODIMENTS

Embodiments of the present invention will next be described in detail with reference to the drawings. First, the configuration of a vapor-liquid separator A according to a first embodiment of the present invention will be described with reference to FIGS. 1 to 4.

Figure 1:
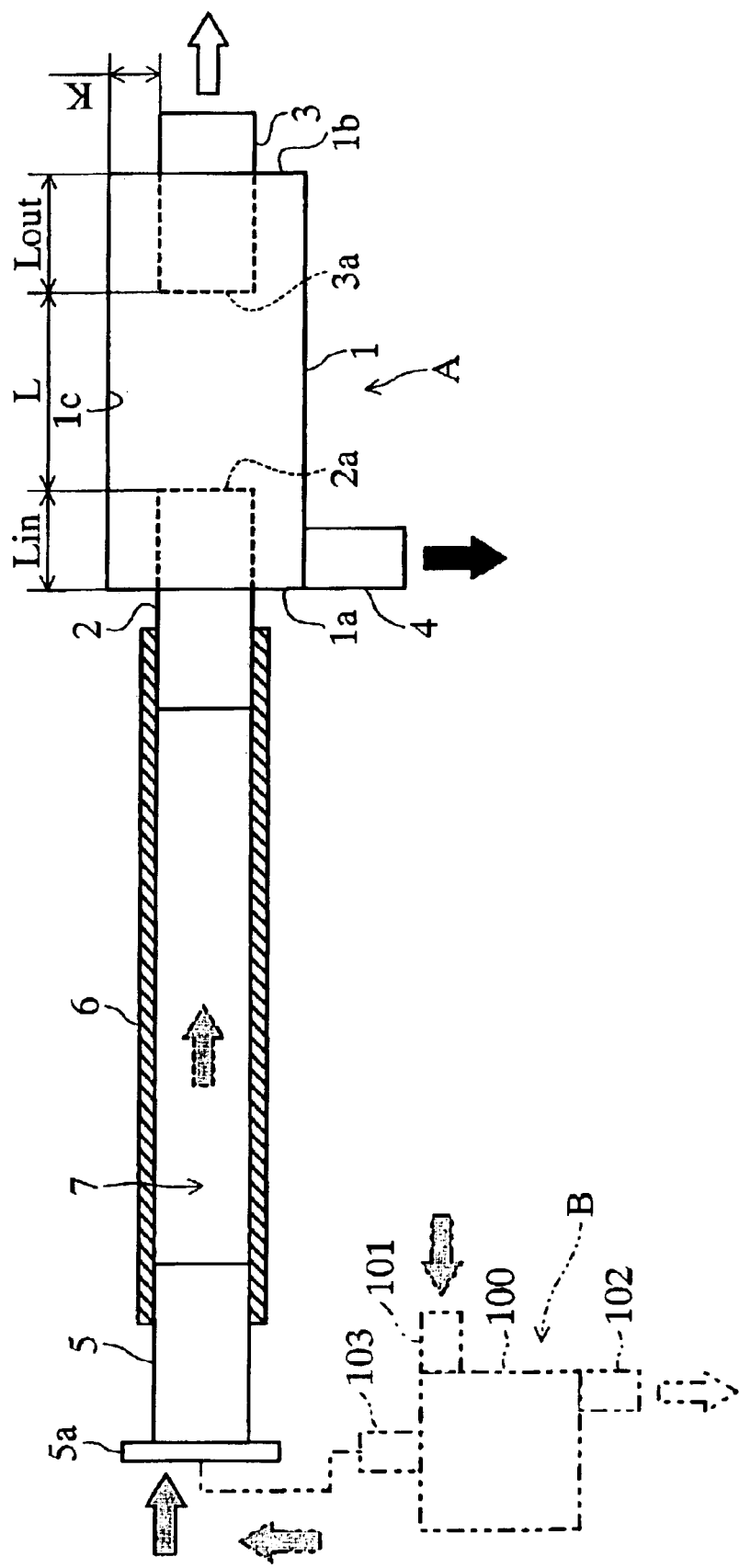
FIG. 1 is a partially sectional view showing the schematic configuration of a vapor-liquid separator according to a first embodiment of the present invention.

FIG. 1 schematically shows the vapor-liquid separator A with a partial cross section. Referring to FIG. 1, a cylindrical introduction tube 2 allowing passage of a vapor-liquid two-phase fluid is fixedly attached to the left-hand end of a cylindrical outer tube 1 via a cover 1a in a hermetic, coaxial condition by means of welding or a like process. A cylindrical delivery tube 3 allowing passage of the vapor phase separated from the vapor-liquid two-phase fluid is fixedly attached to the right-hand end of the outer tube 1 via a cover 1b in a hermetic, coaxial condition by means of welding or a like process. Thus, the introduction tube 2 and the delivery tube 3 are coaxially arranged. The outer tube 1, the introduction tube 2, and the delivery tube 3 are disposed horizontally.

An outlet 2a of the introduction tube 2, via which the vapor-liquid two-phase fluid flows out of the introduction tube 2, is located axially inside the outer tube 1 by predetermined axial distance Lin as measured from the axially left-hand end face of the outer tube 1. In the vicinity of the outlet 2a, the introduction path formed by the introduction tube 2 is broadened toward the outlet end of the introduction tube 2; i.e., the inner wall of the introduction tube 2 is tapered (or chamfered) in such a manner that the cross sectional area of the introduction path increases toward the outlet end of the introduction path. Alternatively, a portion of the introduction tube 2 in the vicinity of the outlet 2a may be expanded toward the outlet end of the introduction tube 2 in such a manner as to assume a bugle-like shape. A delivery port 3a is formed on the delivery tube 3 and allows passage of the vapor phase separated from the vapor-liquid two-phase fluid. The delivery port 3a is located axially inside the outer tube 1 by predetermined axial distance Lout as measured from the axially right-hand end face of the outer tube 1. As a result, the outlet 2a and the delivery port 3a are coaxially located in opposition to each other and away from each other by predetermined axial distance L. Further, the outer tube 1 surrounds the outlet 2a of the introduction tube 2 and the delivery port 3a of the delivery tube 3 while providing radial separations of the predetermined distance K between the inner wall surface 1c of the outer tube 1 and the outlet 2a and the delivery port 3a.

A discharge tube 4 is fixedly attached in a hermetic condition to the outer tube 1 in the vicinity of the axial end face of the outer tube 1 on the side toward the introduction tube 2 (in the vicinity of the axially left-hand end face). The discharge tube 4 is adapted to discharge therefrom the liquid phase separated from the vapor-liquid two-phase fluid.

One end of a rubber hose 6 having a predetermined length is hermetically connected to an end portion (the left-hand end portion in FIG. 1) of the introduction tube 2, which receives the vapor-liquid two-phase fluid, and the other end of the rubber hose 6 is hermetically connected to an inlet tube 5 having a flange portion 5a, whereby the introduction tube 2 and the inlet tube 5 are hermetically connected via the rubber hose 6. The introduction tube 2, the rubber hose 6, and the inlet tube 5 constitute an introduction path 7.

Figure 2:
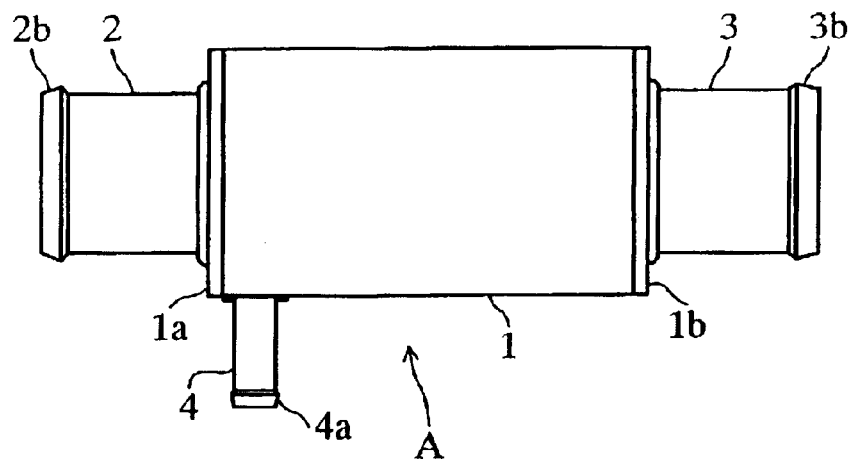
FIG. 2 is a front view showing the arrangement of an outer tube, an introduction tube, a delivery tube, and a discharge tube in the vapor-liquid separator of FIG. 1.

FIG. 2 is a front view showing the arrangement of the outer tube 1, the introduction tube 2, the delivery tube 3, and the discharge tube 4 in the vapor-liquid separator A according to the first embodiment. In FIG. 2, structural features similar to those in FIG. 1 are denoted by common reference numerals, and repeated description thereof is omitted (this is also applied to FIGS. 3 to 9).

As shown in FIG. 2, a flange portion 2b is formed at an inlet end portion (a distal end portion in FIG. 2) of the introduction tube 2 so as to facilitate hermetic connection to the rubber hose 6. Similarly, a flange portion 3b and a flange portion 4a are formed at corresponding distal end portions (as viewed in FIG. 2) of the delivery tube 3 and the discharge tube 4 so as to facilitate hermetic connection to unillustrated parts.

Figure 3:
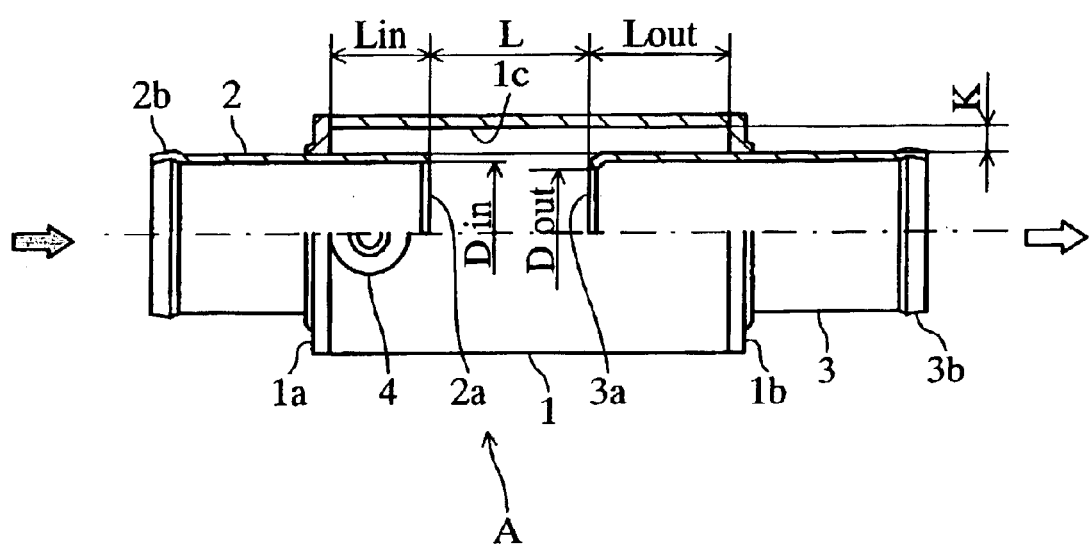
FIG. 3 is a half sectional bottom view showing the arrangement of the outer tube, the introduction tube, the delivery tube, and the discharge tube in the vapor-liquid separator of FIG. 1.

FIG. 3 is a half sectional bottom view showing the arrangement of the outer tube 1, the introduction tube 2, the delivery tube 3, and the discharge tube 4 in the vapor-liquid separator A according to the first embodiment. As shown in FIG. 3, the outside diameter of the introduction tube 2 is equal to that of the delivery tube 3, whereas the inside diameter of the delivery port 3a of the delivery tube 3 is slightly smaller than that of the remaining portion of the delivery tube 3. Therefore, diameter Dout of the delivery port 3a of the delivery tube 3 is smaller than diameter Din of the outlet 2a of the introduction tube 2; thus, the opening area of the delivery port 3a of the delivery tube 3 is smaller than that of the outlet 2a of the introduction tube 2.

Figure 4:
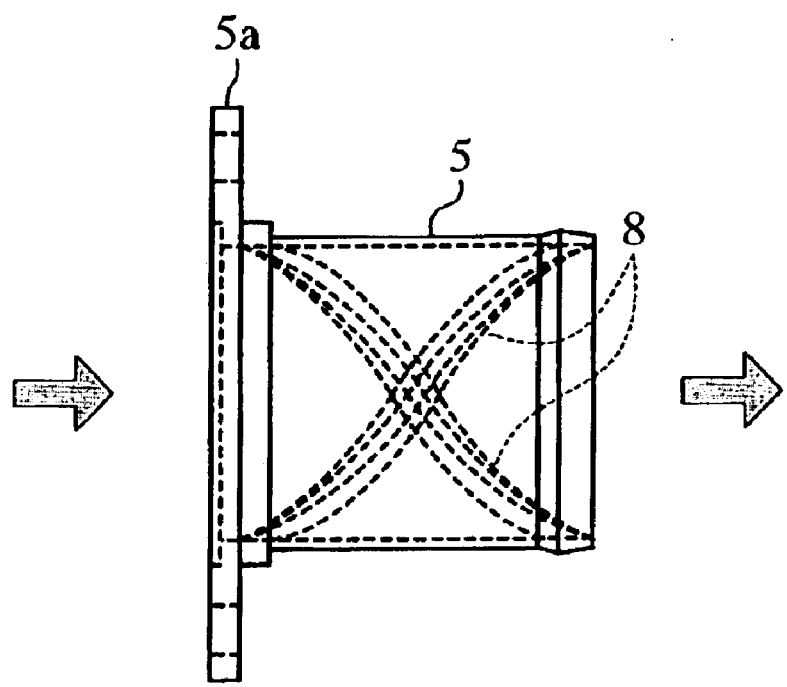
FIG. 4 is a detailed front view showing an inlet tube which partially constitutes an introduction path of the vapor-liquid separator of FIG. 1.

FIG. 4 is a detailed front view showing the inlet tube 5 which partially constitutes the introduction path 7 of the vapor-liquid separator A according to the first embodiment. As shown in FIG. 4, a narrow plate 8 twisted at a predetermined pitch is fixedly provided within the inlet tube 5 in order to impart a swirling state to the vapor-liquid two-phase fluid. The narrow plate 8 may be produced from resin by means of injection molding or from metal by means of press working. When the narrow plate 8 must be formed from metal into a shape with high degree of freedom (e.g., a shape that cannot be satisfactorily formed by means of press working), the narrow plate 8 may be produced by means of casting. FIG. 4 shows the narrow plate 8 which is twisted by one pitch. However, the present invention is not limited thereto. The twisted narrow plate 8 may have an axial length corresponding to two or more pitches.

The configuration of the vapor-liquid separator A according to the first embodiment has been described with reference to FIGS. 1 to 4. Next, the operation of the vapor-liquid separator A will be described.

A vapor-liquid two-phase fluid which is generated as a result of, for example, a chemical reaction in a fuel cell is introduced into the inlet tube 5—which partially constitutes the introduction path 7 of the vapor-liquid separator A—from the flange portion 5a of the inlet tube 5. The vapor-liquid two-phase fluid introduced into the inlet tube 5 passes along the narrow plate 8 twisted at a predetermined pitch, whereby a swirling state is imparted to the vapor-liquid two-phase fluid.

The swirling vapor-liquid two-phase fluid is introduced into the introduction tube 2 via the rubber hose 6, which partially constitutes the introduction path 7. The swirling vapor-liquid two-phase fluid introduced into the introduction tube 2 is discharged from the outlet 2a of the introduction tube 2 while maintaining a swirling motion. Centrifugal force generated in the discharged vapor-liquid two-phase fluid causes the liquid phase, which is of higher specific gravity than the vapor phase, to fly toward the inner wall surface 1c of the outer tube 1, which surrounds the outlet 2a of the introduction tube 2 while providing a radial separation of a distance K between the outer tube 1 and the outlet 2a, thereby separating the liquid phase from the vapor phase. Since in the vicinity of the outlet 2 the introduction path formed by the introduction tube 2 broadens toward the outlet end of the introduction tube 2, the liquid phase that is separated from the vapor-liquid two-phase fluid within the introduction path 7 flies more readily toward the inner wall surface 1c of the outer tube 1. The separated liquid phase impinges on the inner wall surface 1c of the outer tube 1 to thereby be formed into liquid droplets. The thus-formed liquid is discharged to the exterior of the outer tube 1 from the discharge tube 4 provided on the outer tube 1. The vapor phase remaining after separation of the liquid phase is delivered to the exterior of the outer tube 1 from the delivery port 3a of the delivery tube 3.

The operation of the vapor-liquid separator A according to the first embodiment has been described. The vapor-liquid separator A yields the following effects.

First, since the outlet 2a of the introduction tube 2 and the delivery port 3a of the delivery tube 3a are disposed axially in opposition to each other and away from each other by predetermined axial distance L, the vapor-liquid two-phase fluid introduced into the vapor-liquid separator A is not subjected to abrupt change in the direction of flow; thus, a pressure loss arising in the flow of the vapor-liquid two-phase fluid within the vapor-liquid separator A is smaller than that in a cyclone vapor-liquid separator.

Also, since the outer tube 1 surrounds the delivery port 3a formed on the delivery tube 3 while providing a radial separation of the predetermined distance K between the outer tube 1 and the delivery port 3a, the delivery port 3a is located radially inward from the inner wall surface 1c of the outer tube 1. Further, the opening area (corresponding to diameter Dout) of the delivery port 3a formed on the delivery tube 3 is smaller than the opening area (corresponding to diameter Din) of the outlet 2a of the introduction tube 2. Therefore, the liquid phase remaining stagnant in the vicinity of the inner wall surface 1c of the outer tube 1 is unlikely to be caught by a flow of the vapor phase and delivered to the exterior of the outer tube 1 from the delivery port 3a of the delivery tube 3, thereby enhancing the liquid phase recovery percentage of the vapor-liquid separator A.

Further, the outlet. 2a of the introduction tube 2 is located axially inside the outer tube 1 by predetermined axial distance Lin as measured from the axial end face of the outer tube 1; the delivery port 3a formed on the delivery tube 3 is located axially inside the outer tube 1 by predetermined axial distance Lout as measured from the axial end face of the outer tube 1; and the discharge tube 4 is located in the vicinity of the axial end face of the outer tube 1 on the side toward the introduction tube 2. According to the present inventors' experimental findings, axial distances Lin and Lout can be appropriately adjusted in relation to distances L and K such that pressure is distributed on the inner wall surface 1c of the outer tube 1 in such a manner as to gradually decrease toward the introduction tube 2 from the delivery tube 3. Employment of this dimensional feature causes liquid droplets adhering to the inner wall surface 1c of the outer tube 1 to intensively move toward the introduction tube 2; thus, the resultant liquid is intensively discharged from the discharge tube 4 located in the vicinity of the axial end face of the outer tube 1 on the side toward the introduction tube 2. Therefore, even when the outer tube 1 is disposed horizontally, the discharge efficiency for liquid obtained through formation of liquid droplets is enhanced.

Also, since the vapor-liquid two-phase fluid flows linearly in one direction when passing along the narrow plate 8 disposed within the inlet tube 5, which partially constitutes the introduction path 7, a pressure loss arising during the passage is small. Further, since a cyclone vapor-liquid separator—which is of large size and involves a relatively large pressure loss—is not employed, the system as a whole exhibits a small pressure loss and is compact.

Further, through impartment of sufficient length to the rubber hose 6 of the introduction path 7, the rubber hose 6 can recover a large amount of fine liquid droplets (mist) which are generated immediately after the vapor-liquid two-phase fluid passes the inlet tube 5. Specifically, the sufficiently long rubber hose 6 provides time during which a large amount of floating mist can move to the inner wall surface of the rubber hose 6 in the course of passage of the vapor-liquid two-phase fluid through the rubber hose 6. The mist gathering on the inner wall surface of the rubber hose 6 can be formed into liquid droplets, which can be readily recovered by means of the vapor-liquid separator A. The rubber hose 6 is not limited to a straight shape, but may assume a curved shape.

The vapor-liquid separator A according to the first embodiment has been described above. The configuration of the introduction path 7 of the vapor-liquid separator A may be modified, for example, as shown in FIGS. 5 to 7.

Figure 5:
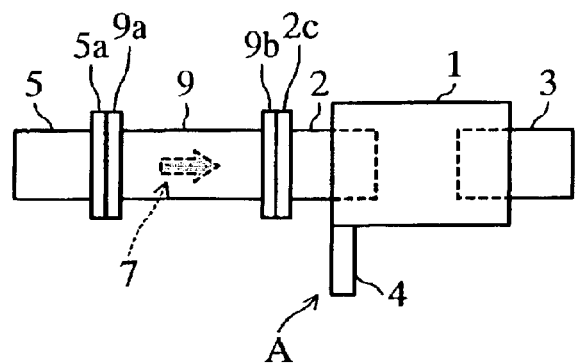
FIG. 5 is a schematic view showing a first modification of the introduction path of the vapor-liquid separator of FIG. 1.

FIG. 5 schematically shows a first modification of the introduction path 7 of the vapor-liquid separator A. As shown in FIG. 5, the introduction path 7 of the first modification employs, in place of the rubber hose 6, a connection tube 9 having flange portions 9a and 9b at its opposite ends. The flange portion 9a of the connection tube 9 is hermetically joined to the flange portion 5a of the inlet tube 5 by use of connection members such as bolts and nuts, and the flange portion 9b of the connection tube 9 is hermetically joined to a flange portion 2c formed on the introduction tube 2 by use of connection members such as bolts and nuts, thereby forming the introduction path 7.

Figure 6:
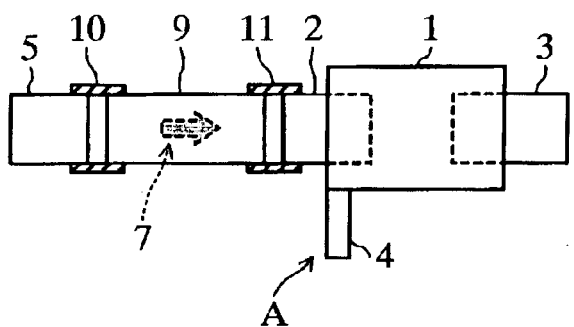
FIG. 6 is a schematic view showing a second modification of the introduction path of the vapor-liquid separator of FIG. 1.

FIG. 6 schematically shows a second modification of the introduction path 7 of the vapor-liquid separator A. As shown in FIG. 6, the introduction path 7 of the second modification employs a connection tube 9 having no flange portions 9a and 9b at its opposite ends. The connection tube 9 is disposed between the introduction tube 2 and the inlet tube 5 which accommodates the narrow plate 8 in the following manner. A left-hand end portion of the connection tube 9 is hermetically joined to a right-hand end portion of the inlet tube 5 by means of a rubber hose 10, and a right-hand end portion of the connection tube 9 is hermetically connected to a left-hand end portion of the introduction tube 2 by means of a rubber hose 11, thereby forming the introduction path 7.

Figure 7:
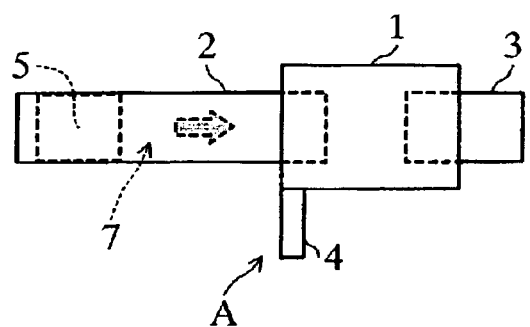
FIG. 7 is a schematic view showing a third modification of the introduction path of the vapor-liquid separator of FIG. 1.

FIG. 7 schematically shows a third modification of the introduction path 7 of the vapor-liquid separator A. As shown in FIG. 7, the introduction path 7 of the third modification does not employ the rubber hose 6, but is configured such that a portion of the introduction tube 2 which projects from the outer tube 1 is elongated, and the inlet tube 5 accommodating the narrow plate 8 is accommodated in the elongated portion of the introduction tube 2.

The configuration of the introduction tube 2 and delivery port 3 of the vapor-liquid separator A may be modified, for example, as shown in FIGS. 8A to 8D.

Figure 8A:
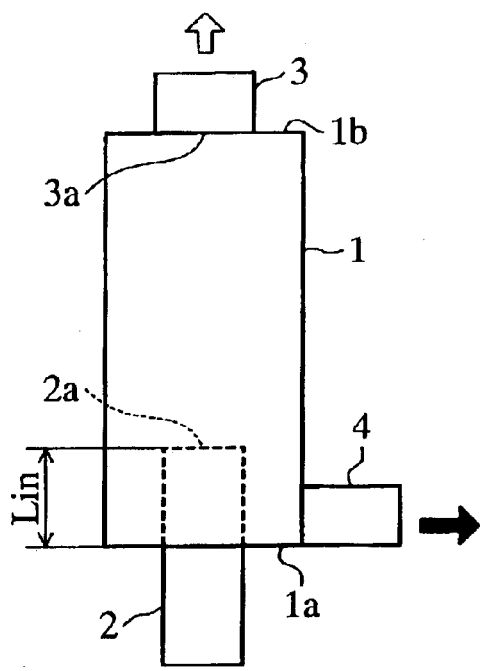
FIGS. 8A to 8D are schematic views showing first to fourth modifications of the configuration of the introduction tube and the delivery tube of the vapor-liquid separator of FIG. 1.

FIG. 8A shows a first modification of the configuration of the introduction tube 2 and the delivery tube 3 of the vapor-liquid separator A according to the first embodiment. The configuration of FIG. 8A is similar in terms of the introduction tube 2 to that of FIG. 1, but differs from that of FIG. 1 in that the delivery port 3a is not located axially inside the outer tube 1, but is located at the axial position of the cover 1b.

Figure 8B:
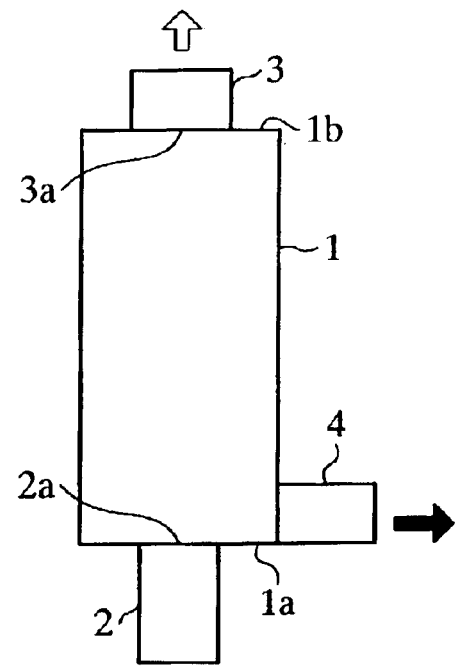

FIG. 8B shows a second modification of the configuration of the introduction tube 2 and the delivery tube 3 of the vapor-liquid separator A according to the first embodiment. The configuration of FIG. 8B is similar to that of FIG. 1 in that the introduction tube 2 and the delivery tube 3 are present, but differs from that of FIG. 1 in that the outlet 2a of the introduction tube 2 is not located axially inside the outer tube 1, but is located at the axial position of the cover 1a, and that the delivery port 3a of the delivery tube 3 is not located axially inside the outer tube 1, but is located at the axial position of the cover 1b.

According to the configurations of FIGS. 8A and 8B, distances Lin, Lout, L, and K may not be determined appropriately in terms of their interrelationship, possibly resulting in a failure to yield the previously described effect that pressure is distributed on the inner wall surface 1c of the outer tube 1 in such a manner as to gradually decrease toward the introduction tube 2 from the delivery tube 3. Therefore, in this case, the outer tube 1 is installed vertically so that the discharge tube 4 is located at a bottom portion of the outer tube 1, whereby formed liquid droplets move downward by their own weight, thereby enhancing the discharge efficiency for liquid obtained through formation of liquid droplets.

Figure 8C:
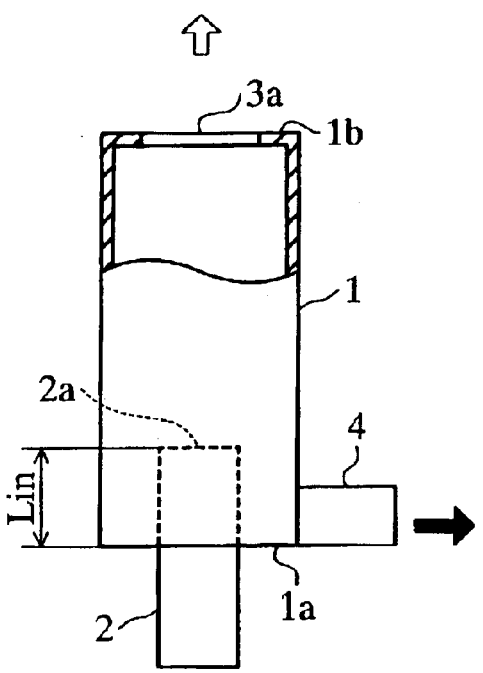

FIG. 8C shows a third modification of the configuration of the introduction tube 2 and the delivery tube 3 of the vapor-liquid separator A according to the first embodiment. The configuration of FIG. 8C is similar in terms of the introduction tube 2 to that of FIG. 1, but differs from that of FIG. 1 in that the delivery tube 3 is absent, and a hole portion of an annular cover 1b of the outer tube 1 serves as the delivery port 3a.

Figure 8D:
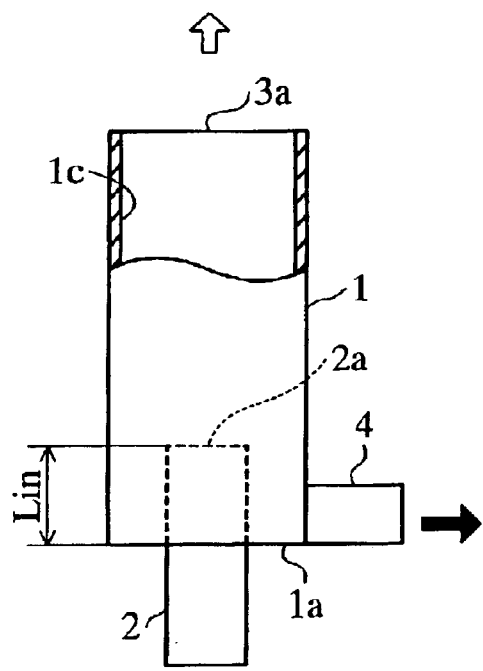

FIG. 8D shows a fourth modification of the configuration of the introduction tube 2 and the delivery tube 3 of the vapor-liquid separator A according to the first embodiment. The configuration of FIG. 8D is similar in terms of the introduction tube 2 to that of FIG. 1, but differs from that of FIG. 1 in that not only the delivery port 3 but also the cover 1b are absent, and the inner wall surface 1c of the outer tube 1 defines the delivery port 3a.

As in the case of the configurations of FIGS. 8A and 8B, according to the configurations of FIGS. 8C and 8D, distances Lin, Lout, L, and K may not be determined appropriately in terms of their interrelationship, possibly resulting in a failure to yield the previously described effect that pressure is distributed on the inner wall surface 1c of the outer tube 1 in such a manner as to gradually decrease toward the introduction tube 2 from the delivery tube 3. Therefore, also in this case, the outer tube 1 is installed vertically so that the discharge tube 4 is located at a bottom portion of the outer tube 1, whereby formed liquid droplets move downward by their own weight, thereby enhancing the discharge efficiency for liquid obtained through formation of liquid droplets. Further, since the delivery tube 3 is not employed, the number of parts is reduced, thereby lowering manufacturing cost.

In the above-described first embodiment, the vapor-liquid two-phase fluid is introduced into the introduction tube 2 of the vapor-liquid separator A via the inlet tube 5 and the rubber hose 6. However, a cyclone vapor-liquid separator B represented with the imaginary line in FIG. 1 may be connected in series to the upstream end (the flange portion 5a) of the inlet tube 5 so as to serve as a first-stage vapor-liquid separator.

The cyclone vapor-liquid separator B includes a cylindrical container 100; an introduction tube 101 for introducing a vapor-liquid two-phase fluid into the container 100 along a direction tangent to the cylindrical inner wall surface of the container 100; a delivery tube 103 disposed on the center axis of the container 100 and adapted to deliver the vapor phase remaining after separation of the liquid phase to the exterior of the container 100 from the interior of the container 100; and a discharge tube 102 for discharging the separated liquid therethrough to the exterior of the container 100 from a bottom portion of the container 100. The container 100 and other components are installed vertically.

In an embodiment which employs the cyclone vapor-liquid separator B as a first-stage vapor-liquid separator and the vapor-liquid separator A as a second-stage vapor-liquid separator, a vapor-liquid two-phase fluid which is generated as a result of, for example, a chemical reaction in a fuel cell is introduced into the introduction tube 101 of the first-stage cyclone vapor-liquid separator B. The vapor-liquid two-phase fluid introduced into the container 100 from the introduction tube 101 flows in a swirling state toward the center axis of the container 100 from the cylindrical inner wall surface of the container 100.

Centrifugal force generated in the vapor-liquid two-phase fluid causes the liquid phase, which is of higher specific gravity than the vapor phase, to fly toward the cylindrical inner wall surface of the container 100, thereby separating the liquid phase from the vapor phase. The separated liquid phase impinges on the cylindrical inner wall surface of the container 100 to thereby be formed into liquid droplets. The thus-formed liquid is discharged to the exterior of the container 100 from the discharge tube 102 to thereby be recovered. The vapor phase remaining after separation of the liquid phase is delivered to the exterior of the container 100 from the delivery tube 103 disposed on the center axis of the container 100 while retaining a swirl velocity component. In this manner, the vapor and liquid phases of the vapor-liquid two-phase fluid are separated from each other.

However, even though the cyclone vapor-liquid separator B is used, not all of the liquid phase can be recovered from the vapor-liquid two-phase fluid. In actuality, the liquid phase is contained in the vapor phase which is delivered to the exterior of the container 100 from the delivery tube 103. Therefore, a vapor-liquid two-phase fluid having a swirl velocity component is delivered to the exterior of the container 100 from the delivery tube 103. Being delivered from the delivery tube 103, the vapor-liquid two-phase fluid having the swirl velocity component undergoes again separation into the vapor phase and the liquid phase within the second-stage vapor-liquid separator A in a manner similar to that in the above-described first embodiment.

In the embodiment that employs the first-stage cyclone vapor-liquid separator B and the second-stage vapor-liquid separator A which are connected in series, the second-stage vapor-liquid separator A can recover the liquid phase which the first-stage cyclone vapor-liquid separator B has failed to recover from the vapor-liquid two-phase fluid, thereby enhancing the overall recovery percentage for the liquid phase.

Specifically, while the vapor-liquid two-phase fluid delivered from the cyclone vapor-liquid separator B and having a swirl velocity component passes through the inlet tube 5, the swirl velocity component is accelerated; thus, the vapor-liquid two-phase fluid discharged from the outlet 2a of the introduction tube 2—which partially constitutes the introduction path 7—has an increased swirl velocity component. The thus-increased swirl velocity component increases centrifugal force imposed on the liquid phase of the vapor-liquid two-phase fluid discharged from the outlet 2a, thereby enhancing the recovery percentage for the liquid phase.

Since the second-stage vapor-liquid separator A is smaller in pressure loss than the first-stage cyclone vapor-liquid separator B, a combined pressure loss of the first and second stages is smaller than in the case where two cyclone vapor-liquid separators B are connected in series.

Figure 9:
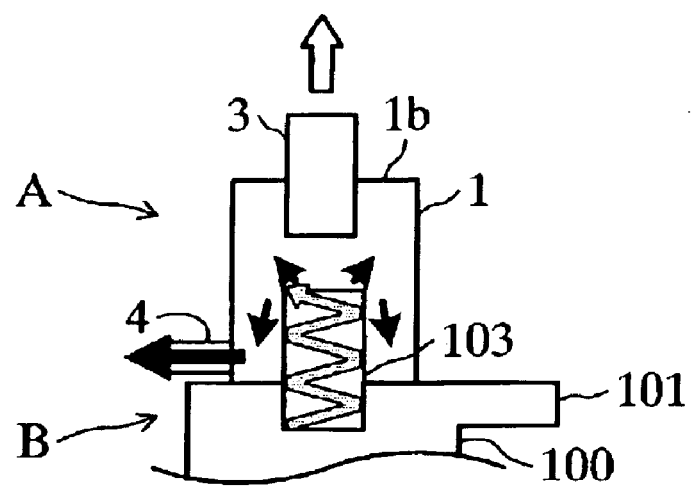
FIG. 9 is a schematic sectional view showing a vapor-liquid separator according to a second embodiment of the present invention.

Next, the configuration of a vapor-liquid separator A according to a second embodiment of the present invention will be described with reference to FIG. 9. FIG. 9 is a schematic sectional view showing the vapor-liquid separator A of the second embodiment. The second embodiment shown in FIG. 9 differs from the first embodiment primarily in that the delivery tube 103 of the first-stage vapor-liquid separator B serves also as the introduction path 7 of the second-stage vapor-liquid separator A.

The second embodiment allows elimination of the introduction path 7 of the second-stage vapor-liquid separator A, thereby reducing the number of parts and in turn lowering manufacturing cost. Since the second-stage vapor-liquid separator A and the first-stage cyclone vapor-liquid separator B are directly connected, the overall axial length of the vapor-liquid separation apparatus composed of the separators A and B is reduced. The second embodiment provides actions and effects substantially similar to those of the first embodiment, and thus repeated description thereof is omitted.

While the present invention has been described with reference to the first and second embodiments, the present invention is not limited thereto, but may be modified as appropriate without departing from the spirit or scope of the invention.

The first embodiment shown in FIG. 1 employs the narrow plate 8 provided within the inlet tube 5 which partially constitutes the introduction path 7. However, the narrow plate 8 may be omitted. In this case, only the cyclone vapor-liquid separator B which is represented with the imaginary line in FIG. 1 imparts a swirl velocity component to the vapor-liquid two-phase fluid. Even in this case, the second-stage vapor-liquid separator A can recover the liquid phase which the first-stage cyclone vapor-liquid separator B has failed to recover from the vapor-liquid two-phase fluid, thereby enhancing the recovery percentage for the liquid phase.

In the second embodiment, the narrow plate 8 used in the first embodiment may be provided within the delivery tube 103 of the cyclone vapor-liquid separator B. In this case, the vapor-liquid two-phase fluid which has passed through the first-stage cyclone vapor-liquid separator B is further accelerated in terms of swirl velocity component in the delivery tube 103, thereby further accelerating vapor-liquid separation which is effected by means of centrifugal force in the second-stage vapor-liquid separator A, and thus further enhancing the recovery percentage for the liquid phase within the vapor-liquid separator A.

What is claimed is:

1. A vapor-liquid separator comprising:

an introduction path allowing passage of a two-phase vapor-liquid fluid in a swirling state, said introduction path having an outlet via which the two-phase vapor-liquid fluid flows out of said introduction path;

a delivery port provided in opposition to said outlet of said introduction path at a predetermined axial distance from said outlet and allowing passage of vapor phase separated from the two-phase vapor-liquid fluid;

an outer tube surrounding said outlet of said introduction path while providing a predetermined separation between said outer tube and said outlet, said outer tube separating the vapor phase and liquid phase from each other; and a discharge tube provided on said outer tube and adapted to discharge from said outer tube the liquid phase separated from the two-phase vapor-liquid fluid, wherein said delivery port is formed on a delivery tube and said outer tube surrounds said delivery port while providing a predetermined separation between said outer tube and said delivery port, wherein said outlet of said introduction path and said delivery port formed on said delivery tube are located axially inside said outer tube by respectively predetermined axial distances as measured from corresponding axial end faces of said outer tube, and said discharge tube is located in the vicinity of the axial end face of said outer tube on a side toward said introduction path.

2. A vapor-liquid separator according to claim 1, wherein a portion of said introduction path in the vicinity of said outlet broadens toward an outlet end of said introduction path.

3. A vapor-liquid separator according to claim 1, wherein an opening area of said delivery port formed on said delivery tube is smaller than an opening area of said outlet of said introduction path.

4. A vapor-liquid separator according to claim 1, wherein a narrow plate twisted at a predetermined pitch is disposed within said introduction path in order to generate a swirling flow of the vapor-liquid two-phase fluid.

5. A vapor-liquid separator according to claim 1, wherein said introduction path is connected to a delivery tube of a swirl vapor-liquid separator, which delivery tube allows passage of the vapor-liquid two-phase fluid in a swirling state.

6. A vapor-liquid separator according to claim 1, wherein said introduction path is formed in a delivery tube of a swirl vapor-liquid separator, which delivery tube allows passage of the vapor-liquid two-phase fluid in a swirling state.

* * * * *